US008327281B2

(12) United States Patent
Fukuda et al.

(10) Patent No.: US 8,327,281 B2
(45) Date of Patent: Dec. 4, 2012

(54) ACCESS CONTROL APPARATUS, ACCESS CONTROL METHOD, AND ACCESS CONTROL PROGRAM

(75) Inventors: Tetsu Fukuda, Yokohama (JP); Tomoyuki Ohno, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 12/559,425

(22) Filed: Sep. 14, 2009

(65) Prior Publication Data
US 2010/0005391 A1     Jan. 7, 2010

Related U.S. Application Data

(60) Division of application No. 12/115,846, filed on May 6, 2008, now Pat. No. 7,610,629, which is a continuation of application No. 11/038,077, filed on Jan. 21, 2005, now Pat. No. 7,412,717.

(30) Foreign Application Priority Data

Jan. 23, 2004   (JP) ................................ 2004-015919
Jan. 17, 2005   (JP) ................................ 2005-008723

(51) Int. Cl.
*G06F 3/048* (2006.01)
*G06F 3/00* (2006.01)
(52) U.S. Cl. ........ 715/764; 709/203; 709/204; 709/206; 715/716; 715/740; 715/744
(58) Field of Classification Search ................. 715/716, 715/740, 744, 764; 709/203, 204, 209
See application file for complete search history.

(56) References Cited

U.S. PATENT DOCUMENTS

| | | | | |
|---|---|---|---|---|
| 5,442,744 A | * | 8/1995 | Piech et al. | 715/251 |
| 5,821,933 A | * | 10/1998 | Keller et al. | 715/741 |
| 5,862,395 A | * | 1/1999 | Bier | 712/1 |
| 5,959,624 A | * | 9/1999 | Johnston et al. | 715/746 |
| 5,966,125 A | * | 10/1999 | Johnson | 715/835 |
| 5,986,654 A | * | 11/1999 | Alexander et al. | 715/744 |
| 6,104,398 A | * | 8/2000 | Cox et al. | 715/821 |
| 6,166,716 A | * | 12/2000 | Kashino | 726/19 |
| 6,208,340 B1 | * | 3/2001 | Amin et al. | 715/808 |
| 6,333,752 B1 | * | 12/2001 | Hasegawa et al. | 715/764 |
| 6,407,760 B1 | * | 6/2002 | Aritomi | 715/810 |
| 6,535,229 B1 | * | 3/2003 | Kraft | 715/764 |
| 6,598,054 B2 | * | 7/2003 | Schuetze et al. | 1/1 |
| 6,633,310 B1 | * | 10/2003 | Andrew et al. | 715/728 |
| 6,714,965 B2 | * | 3/2004 | Kakuta et al. | 709/204 |
| 6,744,529 B2 | * | 6/2004 | Winter et al. | 358/1.15 |
| 6,784,925 B1 | * | 8/2004 | Tomat et al. | 348/207.11 |
| 6,928,622 B2 | * | 8/2005 | Bosma et al. | 715/769 |
| 6,952,775 B1 | | 10/2005 | Miura | |
| 6,959,423 B2 | * | 10/2005 | Bosma et al. | 715/845 |
| 6,961,511 B2 | | 11/2005 | Phno | |
| 6,964,025 B2 | * | 11/2005 | Angiulo et al. | 715/838 |

(Continued)

FOREIGN PATENT DOCUMENTS

EP     0614308     7/1994

(Continued)

*Primary Examiner* — Steven B Theriault
(74) *Attorney, Agent, or Firm* — Fitzpatrick, Cella, Harper & Scinto

(57) ABSTRACT

Additional information indicating photographic conditions for a received image signal is compared with additional information indicating photographic conditions for an access target image signal. If the both conditions satisfy a predetermined relationship, an access to the access target image signal is permitted.

9 Claims, 15 Drawing Sheets

COMPLETE REGISTRATION BY "REGISTER" KEY
CANCEL BY "RETURN" KEY

U.S. PATENT DOCUMENTS

| | | | |
|---|---|---|---|
| 7,003,737 B2 * | 2/2006 | Chiu et al. | 715/848 |
| 7,051,282 B2 * | 5/2006 | Marcjan | 715/743 |
| 7,181,700 B2 * | 2/2007 | Guerrero | 715/810 |
| 7,215,799 B2 | 5/2007 | Tokunaga | |
| 7,243,079 B1 * | 7/2007 | Manolis et al. | 705/26.81 |
| 7,289,132 B1 * | 10/2007 | Reid et al. | 345/660 |
| 7,356,778 B2 * | 4/2008 | Hooper et al. | 715/841 |
| 7,417,680 B2 * | 8/2008 | Aoki et al. | 348/333.05 |
| 7,568,161 B2 * | 7/2009 | Khalsa | 715/760 |
| 7,664,342 B2 * | 2/2010 | Kuwata et al. | 382/305 |
| 7,679,773 B2 * | 3/2010 | Kusama et al. | 358/1.18 |
| 7,836,477 B2 * | 11/2010 | Kuwata et al. | 725/105 |
| 7,913,175 B2 * | 3/2011 | Nagata et al. | 715/752 |
| 2001/0028363 A1 * | 10/2001 | Nomoto et al. | 345/748 |
| 2002/0016964 A1 | 2/2002 | Aratani | |
| 2002/0154166 A1 * | 10/2002 | Sanders et al. | 345/764 |
| 2003/0033296 A1 * | 2/2003 | Rothmuller et al. | 707/3 |
| 2004/0061805 A1 | 4/2004 | Shibamiya | |
| 2004/0068740 A1 | 4/2004 | Fukuda | |
| 2004/0107449 A1 | 6/2004 | Fukuda | |
| 2004/0174563 A1 * | 9/2004 | Cassidy et al. | 358/1.18 |
| 2004/0175764 A1 * | 9/2004 | Nishiyama et al. | 435/7.2 |
| 2004/0194026 A1 * | 9/2004 | Barrus et al. | 715/515 |
| 2004/0201692 A1 * | 10/2004 | Parulski et al. | 348/207.1 |
| 2004/0257341 A1 * | 12/2004 | Bear et al. | 345/157 |
| 2005/0091615 A1 * | 4/2005 | Suzuki | 715/863 |
| 2005/0172332 A1 | 8/2005 | Fukuda | |
| 2007/0055940 A1 * | 3/2007 | Moore et al. | 715/738 |

FOREIGN PATENT DOCUMENTS

| | | |
|---|---|---|
| JP | 6-301754 | 10/1994 |
| JP | 2001-195146 | 7/2001 |

* cited by examiner

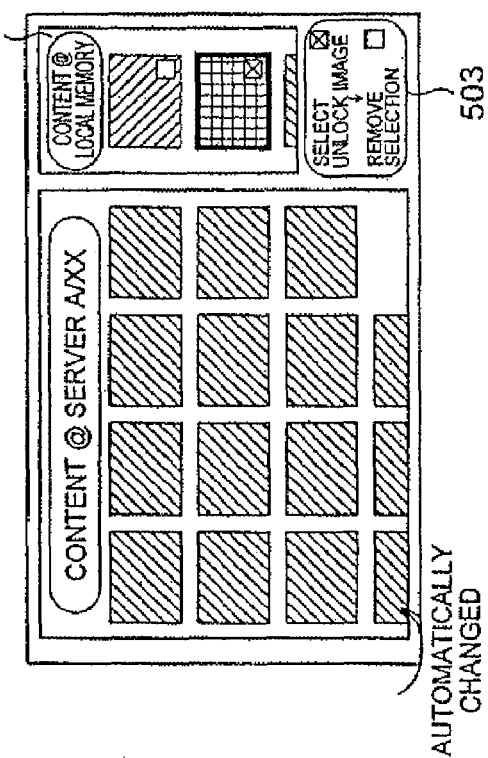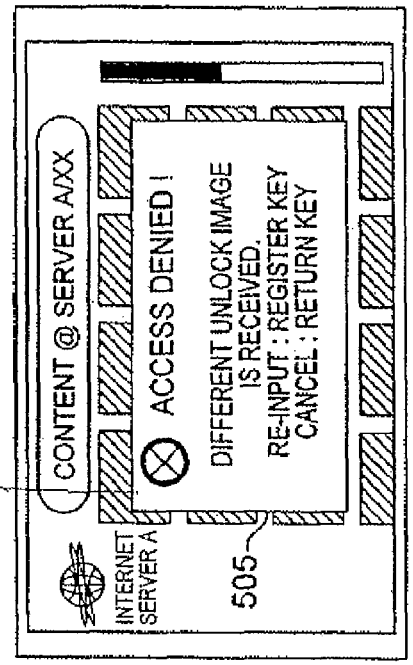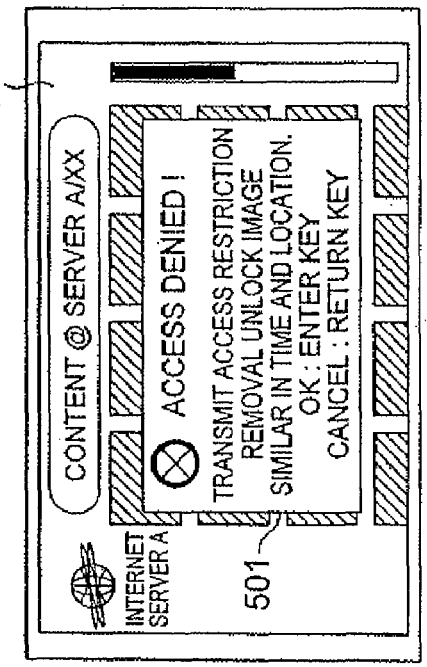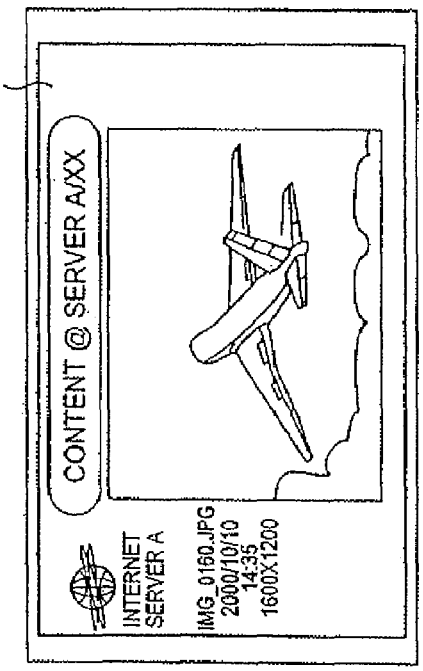

FIG. 8A

| Data Time Original | DATE AND TIME WHEN ORIGINAL IMAGE DATA WAS GENERATED |
|---|---|
| Data Time Digital | DATA AND TIME WHEN DIGITAL DATA WAS PRODUCED |
| SubSecTime | SUB-SEC OF Data Time |
| SubSecTimeOriginal | SUB-SEC OF Data Time Original |
| SubSecTimeDigitized | SUB-SEC OF Data Time Digitized |

FIG. 8B

| GPS VersionID | VERSION OF GPS TAG |
|---|---|
| GPS LatitudeRef | NORTH LATITUDE OR SOUTH LATITUDE |
| GPS Latitude | LATITUDE (NUMERIC VALUE) |
| GPS LongitudeRef | EAST LONGITUDE OR WEST LONGITUDE |
| GPS Longitude | LONGITUDE (NUMERIC VALUE) |
| GPS AltitudeRef | UNIT OF ALTITUDE |
| GPS Altitude | ALTITUDE (NUMERIC VALUE) |
| GPS TimeStamp | GPS TIME (UTC) |
| GPS Satelites | INFORMATION ON SATELLITE USED FOR LOCATION MEASURING |
| GPS Status | STATUS OF GPS RECEIVER |
| GPS MesureMode | GPS LOCATION MEASURING MODE |
| GPS DOP | RELIABILITY OF LOCATION MEASURING |
| GPS SpeedRef | UNIT OF SPEED |
| GPS Speed | SPEED (NUMERIC VALUE) |
| GPS TrackRef | UNIT OF ADVANCING DIRECTION |
| GPS Track | ADVANCING DIRECTION (NUMERIC VALUE) |
| GPS ImgDirectionRef | UNIT OF DIRECTION OF PHOTOGRAPHED IMAGE |
| GPS ImgDirection | DIRECTION OF PHOTOGRAPHED IMAGE (NUMERIC VALUE) |
| GPS MapDatum | MAP DATA USED FOR LOCATION MEASURING |
| GPS DestLatitudeRef | NORTH LATITUDE OR SOUTH LATITUDE OF DESTINATION |
| GPS DestLatitude | LATITUDE OF DESTINATION (NUMERIC VALUE) |
| GPS DestLongitudeRef | EAST LONGITUDE OR WEST LONGITUDE OF DESTINATION |
| GPS DestLongitude | LONGITUDE OF DESTINATION (NUMERIC VALUE) |
| GPS DestBearingRef | UNIT OF BEARINGS OF DESTINATION |
| GPS DestBearing | BEARINGS OF DESTINATION (NUMERIC VALUE) |
| GPS DestDistanceRef | UNIT OF DISTANCE TO DESTINATION |
| GPS DestDistance | DISTANCE TO DESTINATION (NUMERIC VALUE) |

FIG. 9A

| REGISTERING APPARATUS | IMAGE GROUP IDENTIFIER (FOLDER NAME) | IMAGE IDENTIFIER (FILE NAME) | ACCESS RESTRICTION |
|---|---|---|---|
| 000085045CEA | 5CEA-1 | IMG_0160.JPG | 1 |
| | | IMG_0169.JPG | 1 |
| | | IMG_0172.JPG | 0 |
| | | IMG_0177.JPG | 0 |
| | | : | : |
| | 5CEA-2 | IMG_0273.JPG | 1 |
| | | IMG_0289.JPG | 0 |
| | | IMG_0290.JPG | 0 |
| | | : | : |
| 000085045BCC | motor show | IMG_1879.JPG | 0 |
| | | : | : |
| 0000850EAA99 | athletic meet | IMG_0098.JPG | 1 |
| | | : | : |
| : | : | : | : |

FIG. 9B

| DATE | TIME | GPS | | | |
|---|---|---|---|---|---|
| | | NORTH LATITUDE OR SOUTH LATITUDE | LATITUDE | EAST LONGITUDE OR WEST LONGITUDE | LONGITUDE |
| 2002/7/28 | 14:16:00 | "N" | 35.28.9.20 | "E" | 138.34.42.20 |
| 2002/7/28 | 15:06:00 | "N" | 35.26.08.5 | "E" | 138.21.09.30 |
| 2002/10/10 | 6:26:00 | "N" | 44.20.08.7 | "E" | 145.14.45.3 |
| 2002/10/11 | 18:11:12 | "N" | 44.21.25.6 | "E" | 145.22.18.6 |
| : | : | : | : | : | : |

FIG.15

| IMAGE GROUP IDENTIFIER (FOLDER NAME) | IMAGE IDENTIFIER (FILE NAME) | ACCESS RESTRICTION |
|---|---|---|
| 001 | IMG_0160.JPG | 1 |
| | IMG_0169.JPG | 1 |
| | IMG_0172.JPG | 0 |
| | IMG_0177.JPG | 0 |
| | ⋮ | ⋮ |
| 002 | IMG_0273.JPG | 1 |
| | IMG_0289.JPG | 0 |
| | IMG_0290.JPG | 0 |
| | ⋮ | ⋮ |
| motor show | IMG_1879.JPG | 0 |
| | ⋮ | ⋮ |
| athletic meet | IMG_0098.JPG | 1 |
| | ⋮ | ⋮ |
| ⋮ | ⋮ | ⋮ |

ACCESS CONTROL APPARATUS, ACCESS CONTROL METHOD, AND ACCESS CONTROL PROGRAM

This application is a division of U.S. application Ser. No. 12/115,846, filed on May 6, 2008 (pending), which was a continuation of U.S. application Ser. No. 11/038,077, filed Jan. 21, 2005, issued as U.S. Pat. No. 7,412,717 on Aug. 12, 2008, the contents of each of which are incorporated herein by reference.

BACKGROUND OF THE INVENTION

1. Field of the Invention

The present invention relates to an access control apparatus for controlling an access to an image.

2. Description of the Related Art

As the Internet and digital cameras are widespread, an image distribution service for uploading an electronic image to a server on the Internet, opening the electronic image on a website, and thereby enabling many people to view the image is used.

In the service, if a user who opens the image is to restrict viewing users, an access control using a password is popular.

The user who opens the image sets a password on a website for the access control, and notifies each viewing user whom the user wants to view the image of the set password by means such as a telephone or an email.

The viewing user who is notified of the password accesses the website and inputs the password, thereby permitting the viewing user to access the image and to view the image.

European Patent Publication No. EP614308A1 discloses a technique for controlling an access to an additional component for generating a high resolution image, using an authentication code, a key, and a password.

Japanese Patent Application Laid-Open No. 2001-195146 discloses the following technique. A subject image is photographed, registered (stored) as a secret key image, and made to correspond to stored secret information. When the secret information is to be viewed, an image equal in shape to the secret image is photographed. If the photographed image is compared with the secret key image and coincident with the secret key, a secret is unlocked and the secret information is displayed.

SUMMARY OF THE INVENTION

The present application is intended to provide a conventionally-unknown or novel access control method. Examples of disadvantages solved when the invention according to the present application is carried out are as follows.

It is difficult to say that a password input operation for an apparatus, such as a digital television set, having an input device to which a restriction is given is easily performed by a user unfamiliar with the operation. Unlike a keyboard, an operating system, in particular, may possibly differ among manufacturers or apparatuses. In addition, there is a sufficient probability that some apparatuses include input devices undesirable to input the set password.

Further, the user who sets the password needs to notify each viewing user whom the user wants to view the image, and if the number of viewing users is large, a burden is increased. Besides, it is difficult to say that use of the email which can hold a broadcast communication is available, due to presence of the restriction to the input device.

Further, the user who receives the notification of the password must store the password using some means. If the number of user's websites to be viewed increases, a burden related to password storage and management is increased.

It is an object of the present invention to control an access by a simple operation and improve operationality.

According to one aspect of the present invention, an access control apparatus of the present invention is an access control apparatus for controlling an access to an image signal through a network, comprising:

a control circuit that compares additional information indicating photographic conditions for the image signal received through the network with additional information indicating photographic conditions for a stored image signal, and that controls the access to the stored image signal for a sender of the received image signal according to results of the comparison.

An access permission means herein a permission to an operation based on an image signal such as a permission to display an image based on the image signal, a permission to print an image based on the image signal, or a permission to store an image based on the image signal.

Preferably, the access control apparatus further comprises: an image signal registration circuit that stores an image signal in a storage device while relating the image signal to the additional information indicating the photographic conditions; and an access restriction setting circuit that sets an access restriction to the image signal stored in the storage device.

Preferably, the access control apparatus further comprises a display section that displays an image based on the image signal stored in the storage device, wherein the access restriction setting circuit includes a function of selecting an access-restricted image from among a plurality of images displayed in the display section.

Preferably, the additional information indicating the photographic conditions includes at least one of date information, time information, location information, and apparatus identification information.

According to another aspect of the present invention, there is provided an access control method for controlling an access to an image signal through a network, the method comprising steps of:

receiving additional information indicating photographic conditions for the image signal through the network;

comparing the additional information indicating the photographic conditions for the received image signal with additional information indicating photographic conditions for an access target image signal, and determining whether the photographic conditions for the received image signal and the photographic conditions for the access target image signal satisfy a predetermined relationship; and permitting the access to the access target image signal if a comparison result shows that the photographic conditions for the received image signal and the photographic conditions for the access target image signal satisfy the predetermined relationship.

Preferably, the access control method further comprises steps of: receiving the access target image signal and the additional information indicating the photographic conditions for the access target image signal; receiving a selection as to whether to restrict the access to the access target image signal; storing the access target image signal, the additional information on the access target image signal, and information as to whether the access to the image signal is restricted while relating the access target image signal, the additional information, and the information as to whether the access to the image signal is restricted to one another; receiving a request of the access to a stored image signal; determining whether the access to the access-requested image signal is restricted; and requesting transmission of an image signal including the additional information through the network to an access requester if the access to the access-requested image signal is restricted, and permitting the access to the access-requested image signal if the access is not restricted.

Preferably, the additional information indicating the photographic conditions includes at least one of date information, time information, location information, and apparatus identification information.

According to yet another aspect of the present invention, there is provided an access control program for causing a control section included in an access control apparatus that controls an access to an image signal through a network, to execute steps of: receiving additional information indicating photographic conditions for the image signal through the network; comparing the additional information indicating the photographic conditions for the received image signal with additional information indicating photographic conditions for an access target image signal, and determining whether the photographic conditions for the received image signal and the photographic conditions for the access target image signal satisfy a predetermined relationship; and permitting the access to the access target image signal if a comparison result shows that the photographic conditions for the received image signal and the photographic conditions for the access target image signal satisfy the predetermined relationship.

The present invention can provide an operating environment in which an access restriction can be controlled by a simple operation, and can improve an operationality.

Further, since a plurality of levels or stages of access controls can be exercised by combining the method according to the present invention with a known access management method using a password or the like, it is possible to realize a setting and a removal of a complicated access restriction by a simpler operation.

BRIEF DESCRIPTION OF THE DRAWINGS

FIGS. 5A to 5D are explanatory views for examples of a screen configuration and a user's operation for removing a access control over the application software executed by an access restriction removal-side digital television set;

FIGS. 8A and 8B depict Exif tags used to set and remove the access restriction according to the first embodiment of the present invention;

FIGS. 9A and 9B are explanatory view for a content database held in a storage section of the access control apparatus according to the first embodiment of the present invention;

FIG. 15 is an explanatory view for a content database held in a storage section of the access control apparatus according to the second embodiment of the present invention.

DETAILED DESCRIPTION OF THE PREFERRED EMBODIMENTS (First Embodiment)

A first embodiment of the present invention will be described hereinafter in detail with reference to the drawings.

Figure 1:
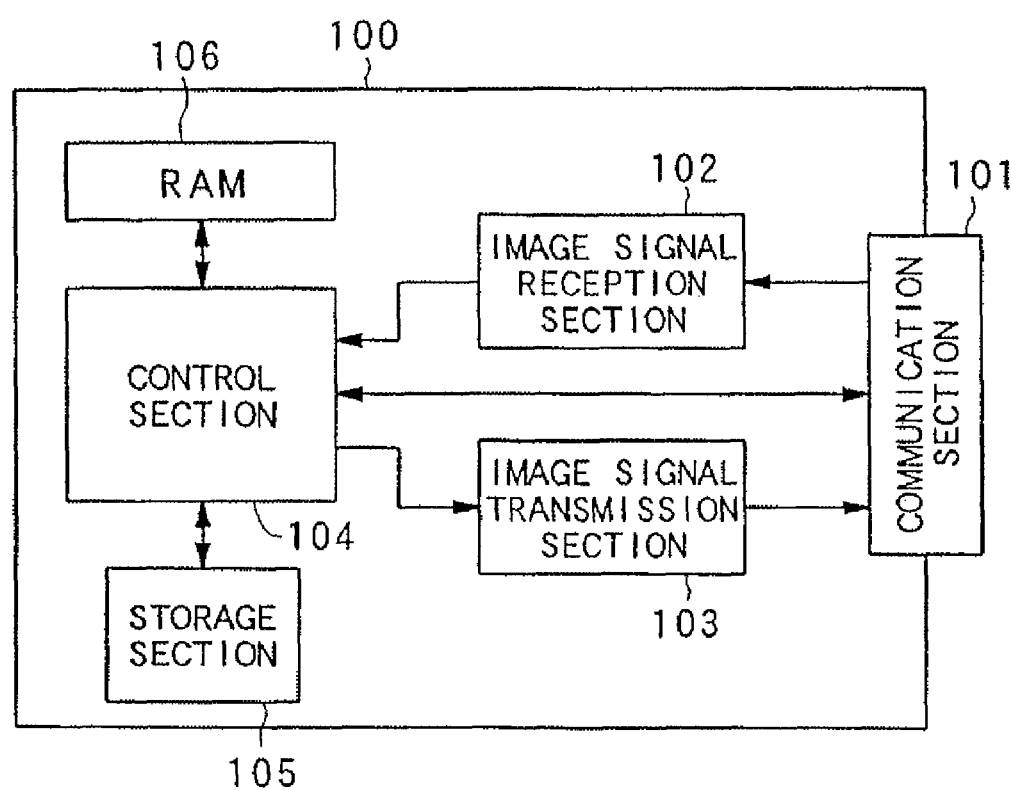
FIG. 1 is a block diagram that depicts a schematic configuration of an access control apparatus according to a first embodiment of the present invention.
Figure 2:
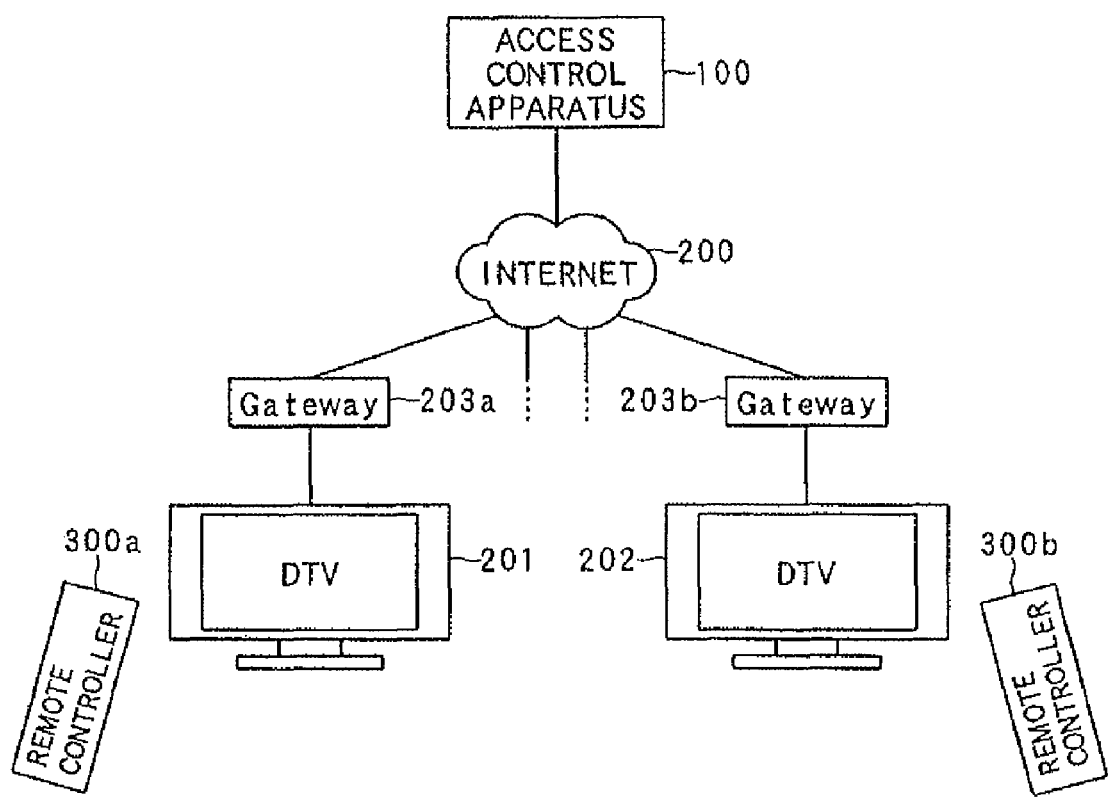
FIG. 2 is a block diagram that depicts a configuration of an access control system including the access control apparatus according to the first embodiment of the present invention.

FIG. 1 is a block diagram that depicts a schematic configuration of an access control apparatus according to a first embodiment of the present invention. FIG. 2 is a block diagram that depicts a configuration of an access control system including the access control apparatus according to the first embodiment of the present invention.

An access control apparatus 100 includes basic functions of a WEB server present on the Internet, and provides these functions to each client machine. Reference symbol 101 denotes a communication section connected to the Internet and holding a communication with an external client machine. Reference symbol 102 denotes an image signal reception section that receives a lock image for an access restriction setting, to be described later, and an unlock image for an access restriction removal, to be described later. Reference symbol 103 denotes an image signal transmission section that transmits an image to an access-permitted client machine. Reference symbol 104 denotes a control section (control circuit) that integrally controls an overall operation for the access control. Reference symbol 105 denotes a storage section (storage device) that stores a content database, to be described later, for each album. Reference symbol 106 denotes a random-access memory (RAM) appropriately used by the control section 104.

Referring to FIG. 2, reference symbols 201 and 202 denote digital television sets serving as client machines according to the first embodiment. Each of the digital television sets 201 and 202 communicates with the access control apparatus 100 through a gateway 203a or 203b and the Internet 200. Each of the digital television sets 201 and 202 also includes an operating environment in which an application software, to be described later, can be run.

Figure 3:
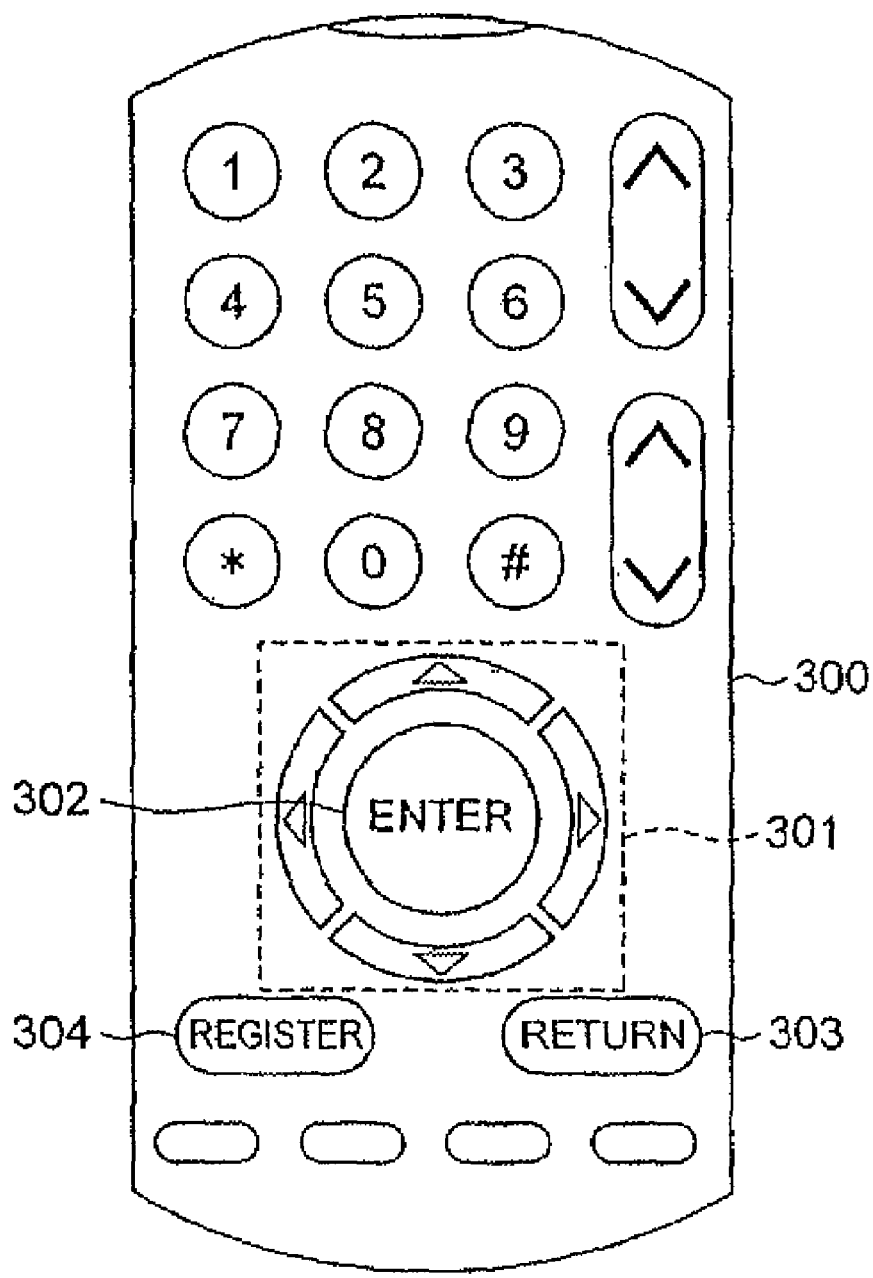
FIG. 3 is a schematic diagram of a remote controller.

FIG. 3 depicts an outline of a remote controller annexed to each of the digital television sets 201 and 202. Reference symbol 300 denotes a remote controller main body. Reference symbol 301 denotes a "Direction" key for moving a cursor or the like displayed on a screen using the application software. Reference symbol 302 denotes an "Enter" key for executing an item selected by moving the cursor or the like.

Reference 303 denotes a "Return" key used for cancellation and the like. Reference 304 denotes a "Register" key for registering the lock image and the unlock image to be described later.

Remote control keys other than the keys stated above are present on the remote control main body for executing the basic functions of the digital television set. The keys (e.g., Ten keys and channel UP/DOWN keys shown in FIG. 3) that do not contribute to the present invention will not be described herein.

FIGS. 4A and 4B and FIGS. 5A to 5D depict examples of screen configurations of application software executed by the access restriction setting-side digital television set 201 and the access restriction removal-side digital television set 202, respectively.

Figure 4A:
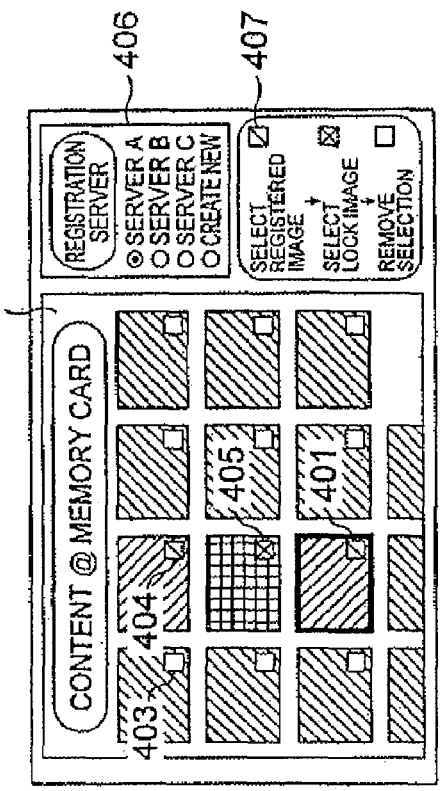
FIGS. 4A and 4B are explanatory views for examples of a screen configuration and a user's operation for registering an application software executed by an access restriction setting-side digital television set.
Figure 4B:
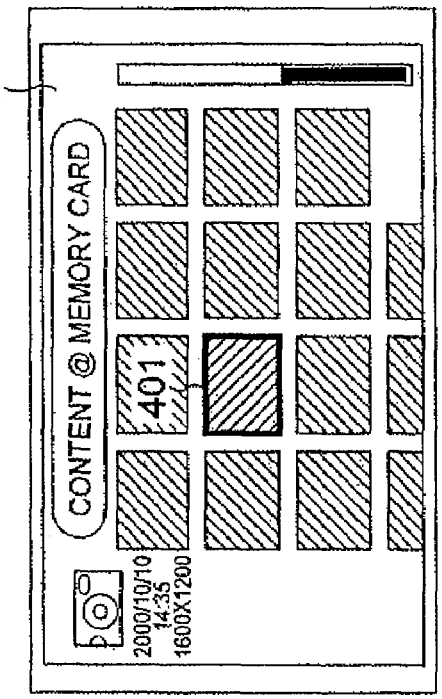

Referring to FIGS. 4A and 4B, the image configuration and a user's operation for the access restriction setting-side digital television 201 will first be described.

FIG. 4A depicts a display screen of an Internet image viewing application software (hereinafter, "image viewing software") displayed on the digital television set 201. The display screen shown in FIG. 4A is in a state in which an image stored in a digital camera or a memory card connected to the digital television set 201 is displayed on the screen, and in which the image can be viewed.

The user inputs the "Register" key 304 on the remote controller so as to register an image in the access control apparatus 100 serving as the WEB server. The screen of the image viewing software is thereby changed to a registration screen shown in FIG. 4B, which screen is in a state in which the image can be registered. The user first selects a registration WEB sever (access control apparatus) in a registration server selection area 406. Using the "Direction" key 301, the user moves a cursor 401 on the screen to the image to be registered and inputs the "Enter" key 302, thereby putting a check mark that represents registration in a registration check box 403 (note that a state of the check box in which the check mark representing registration is put is denoted by reference symbol 404). If the user is further to set an access restriction to a content using a certain image, then the cursor 401 is put on the image to be designated for the access restriction (hereinafter, "lock image") while the registration check mark is put in the registration check box 403 of the lock image (404), and inputs the "Enter" key 302. At this time, a check mark 405 representing that the image is selected as the lock image is put in the registration check box 403. When the user inputs the "Enter" key 302 again in this state, both the registration and the lock image selection setting are cancelled. Further, on the registration screen, a guide that represents a series of operations is displayed to the user as indicated by 407. By inputting the "Registration" key 304 when the registration and the lock image selection setting are finished, the registration and the access restriction setting are completed. Namely, image data in an Exif (Exchangeable Image File) format on the user's selected image as well as information as to whether the access control is present and the like is stored in the storage section 105 of the access control apparatus 100. The control section 104 corresponds to an image signal registration circuit and an access restriction setting circuit.

In this embodiment, it is assumed to use the Exif format widely used as the format of registered and lock image data in digital cameras and the like. The image data in the Exif format corresponds to an image signal that includes additional information. It is noted, however, that the image format according to the present invention is not limited to the Exif format, but that an arbitrary format of the image data including the image information and the additional information can be used.

Referring to FIGS. 5A to 5D, the screen configuration and the user's operation for the access restriction removal-side digital television set 202 will next be described.

The viewing user starts the image viewing software and designates the viewing target WEB server (access control apparatus), whereby the viewing user can view a list of thumbnail images registered in the WEB server. As shown in FIG. 5A, if the access-restricted lock image is included in the images registered in the viewing target server, and the viewing user is to display an original images from one of the thumbnail images, then a message, denoted by reference symbol 501, requesting the viewing user to remove the access restriction is displayed. At this time, by the viewing user's inputting the "Enter" key 302 in response to the message requesting the viewing user to remove the access restriction or with passage of a predetermined time, a screen is changed from that shown in FIG. 5A to that shown in FIG. 5B.

To remove the access restriction, the viewing user selects an image similar in time and location to the image registered in the server and the thumbnail of which is displayed in the list of thumbnail images from among Exif images owned by the viewing user (present in a local memory), and transmits the selected image to the WEB server, i.e., the access control apparatus 100. Reference symbol 502 denotes an operation window for selecting the image (unlock image) for the access restriction removal from among the images stored in the local memory. Using the "Direction" key 301 and the "Enter" key 302, the viewing user determines which image is to be selected in the operation window 502. At this time, a guide that represents operations is displayed to the user as indicated by 503. By inputting the "Registration" key 304 when the viewing user finishes selecting the unlock image, the unlock image is transmitted to the WEB server, i.e., the access control apparatus.

If the set lock image and the transmitted unlock image satisfy a predetermined relationship, or more specifically, if the unlock image falls within a specific range of the lock image in terms of time and location, the viewing user can view the desired original image (indicated by reference symbol 504) as shown in FIG. 5C. If the unlock image is out of the specific range of the set lock image in terms of time and location, a message denoted by reference symbol 505 is displayed on the screen, on which screen the viewing user needs to determine whether to select and transmit the unlock image again or to cancel the unlock image. If the viewing user determines to cancel the unlock image, the viewing user is not permitted to view the desired original image.

An access restriction removal determining method carried out by the access control apparatus will be described later in detail.

Figure 6:
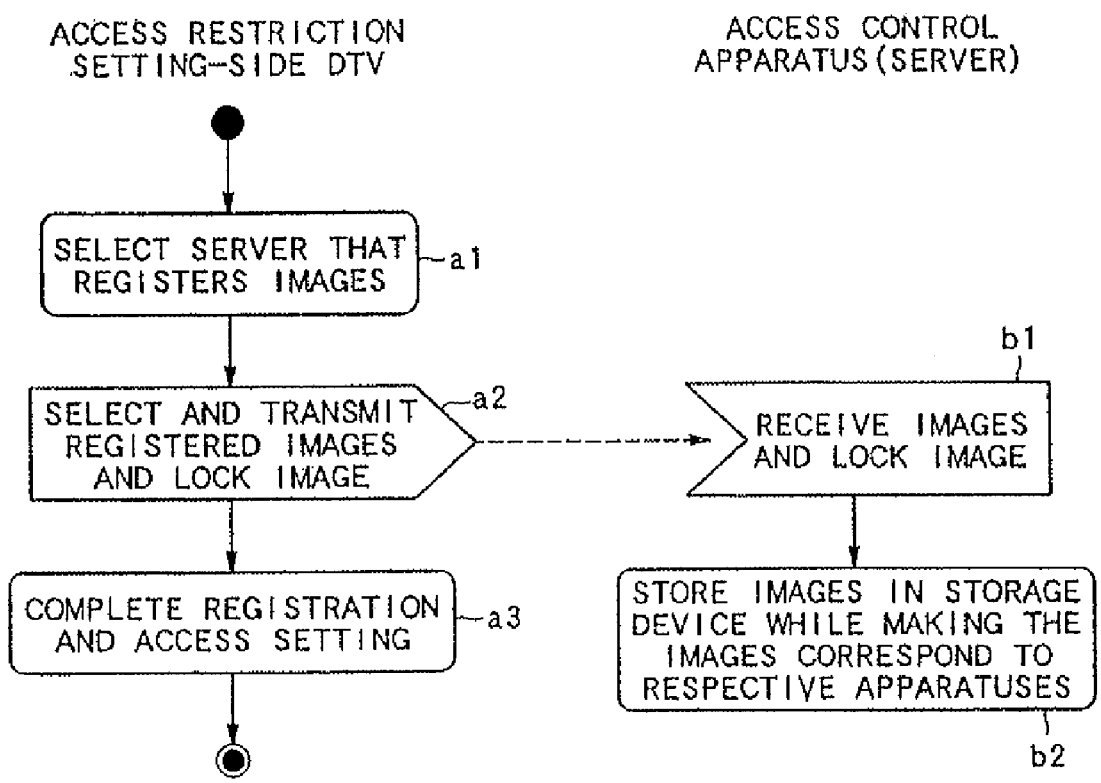
FIG. 6 is a flowchart that depicts an interaction between the access restriction setting-side digital television set and the access control apparatus.

FIG. 6 is a flowchart that depicts an interaction between the access restriction setting-side digital television set 201 and the access control apparatus 100 serving as the WEB server.

As already described, the access restriction setting-side digital television set 201 designates the access control apparatus 100 as the server in which images are registered by a user's operation (at a step a1). The access restriction setting-side digital television set 201 then transmits the registered images and the lock image designated by the user's operation to the access control apparatus 100 (at a step a2). Thus, the access restriction setting-side digital television set 201 completes the registration and the access restriction setting (at a step a3).

On the other hand, the access control apparatus 100 receives the registered images and the lock image from the access restriction setting-side digital television set 201 through the communication section 101 (at a step b1). The access control apparatus 100 then stores the received images as well as information for identifying a sender apparatus in the content database held in the storage section 105 to be described later (at a step b2).

Figure 7:
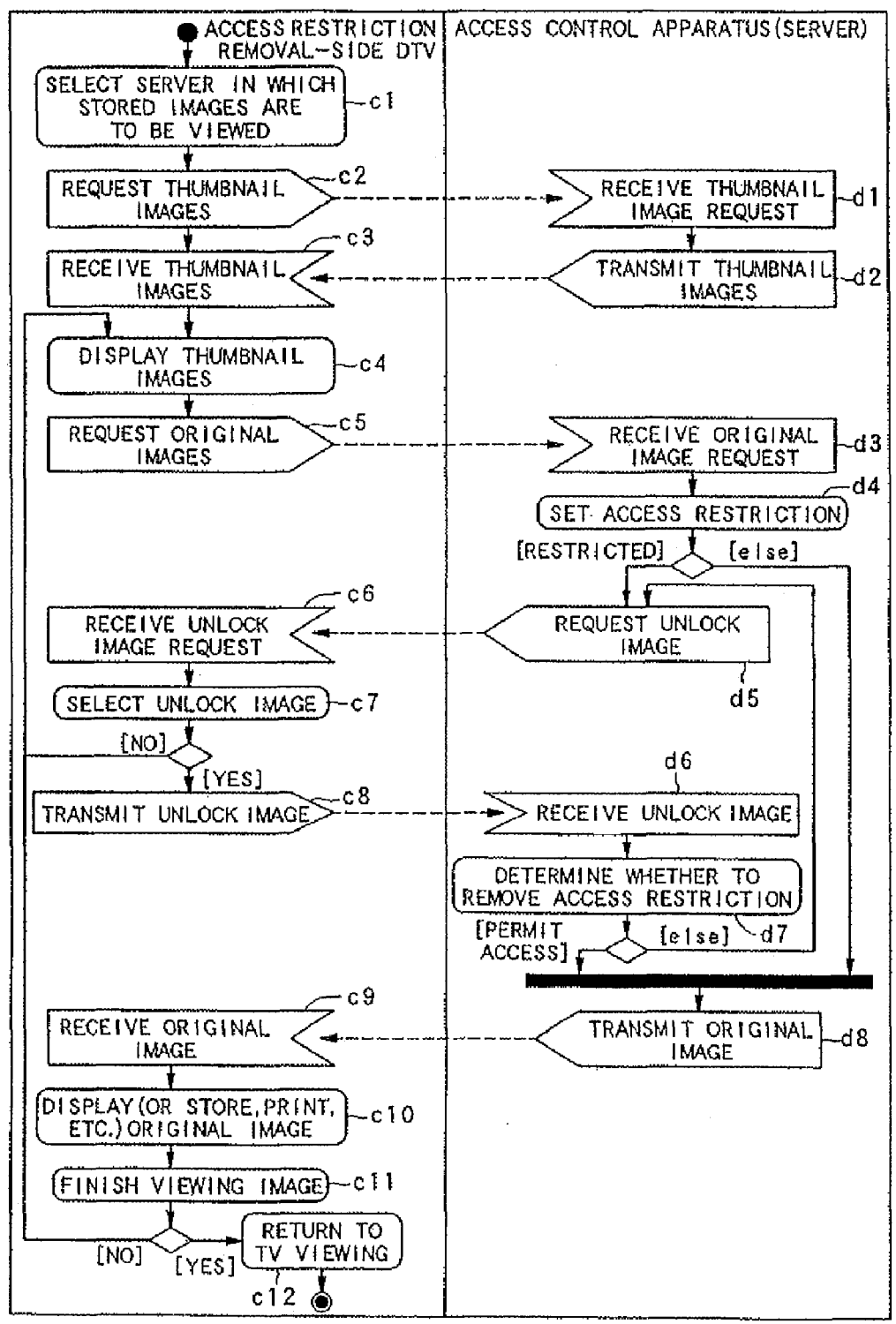
FIG. 7 is a flowchart that depicts an interaction between the access restriction removal-side digital television set and the access control apparatus.

FIG. 7 is a flowchart that depicts an interaction between the access restriction removal-side digital television set 202 and the access control apparatus 100 serving as the WEB server.

The access restriction removal-side digital television set 202 designates' the access control apparatus 100 as the WEB server in which the stored images are to be viewed, by a viewing user's operation (at a step c1). The access restriction removal-side digital television set 202 transmits a request of transmitting thumbnail images of all the registered images, to the designated access control apparatus 100 (at a step c2). The access control apparatus 100 that receives the request transmits the thumbnail images to the digital television set 202 which transmits the request (at steps d1 and d2). The access restriction removal-side digital television set 202 receives the thumbnail images (at a step c3), and displays the list of thumbnails (at a step c4).

When one of the thumbnail images is selected to view the original image in detail by a viewing user's operation, the access restriction removal-side digital television set 202 transmits a request of transmitting the original image corresponding to the selected thumbnail image, to the access control apparatus 100 (at a step c5).

The access control apparatus 100 that receives the request of transmitting the original image confirms whether an access restriction is set to the registered images by referring to the content database held in the storage section 106 to be described later (at steps d3 and d4).

If no access restriction is set to the registered images, the access control apparatus 100 transmits the requested original image to the access restriction removal-side digital television set 202 (at a step d8). The digital television set 202 that receives the original image displays the original image on the display (at steps c9 and c10). If the viewing user finishes viewing the image, the processing returns to television viewing and the power of the digital television set 202 is turned off (at steps c11 and 12). If the viewing user does not finish viewing the image, the processing returns to the display of the list of thumbnail images (at the step c4). In addition, although not shown here, it is possible for the viewing user to finish the software for viewing the image as the application software in the state of the display of the list of thumbnail images, and then to move to television viewing, other application software, or the like, or to turn off the power.

If the access control apparatus 100 detects that the access restriction is set to the registered images, the access control apparatus 100 transmits a request of transmitting an Exif image, as an unlock image for removing the access restriction, to the access restriction removal-side digital television set 202 (at a step d5). The access restriction removal-side digital television set 202 that receives the request selects the unlock image by the above-stated viewing user's operation and transmits the unlock image to the access control apparatus 100 (at steps c6, c7, and a8). If the user does not select the unlock image, the access restriction removal-side digital television set 202 is not permitted to view the original image and the processing returns to the display of the list of thumbnail images (at the step c4).

The access control apparatus 100 that receives the unlock image determines whether to give an access permission to the access restriction removal-side digital television set 202 by the access restriction removal determining method to be described later (at steps d6 and d7). If the access control apparatus 100 determines to give the access permission, the access control apparatus 100 transmits the original image to the access restriction removal-side digital television set 202 (at a step d8). If the access control apparatus 100 determines not to give the access permission, the access control apparatus 100 transmits again the request of transmitting the unlock image to the access restriction removal-side digital television set 202 (at the step d5)

Through the process flow, the access restriction setting and the access restriction removal are performed.

FIGS. 8A and 8B depict Exif tags used to set and remove the access restriction according to the first embodiment of the present invention. In this embodiment, date information shown in FIG. 8A and GPS information shown in FIG. 8B are used.

FIGS. 9A and 9B are explanatory view for a data configuration of the content database held in the storage section 105 of the access control apparatus 100. The access control apparatus 100 stores the Exif images received from the access restriction setting-side digital television set 201 in the storage section 105 as the registered images and the lock image as shown in FIG. 9A.

In FIG. 9A, in a "registering apparatus" box, a value for identifying the apparatus that registers each Exif image is input. In this embodiment, a MAC address is input. In an "image group identifier" box, an identifier intended to identify a folder for bundling a plurality of image files and to represent an album unit is input. In this embodiment, if the user designates a folder name, the image group identifier corresponding to the designated folder name is allocated. If the user does not designate any folder name, an identifier related to the corresponding MAC address is allocated by default. In an "image identifier" box, a file name to identify each Exif image is input. In an "access restriction" box, a value indicating whether the Exif image is the lock image used for the access restriction setting is input.

As for the Exif image registered as the lock image, the Exif data needs to include tags related to dates and locations as the additional information representing photographic conditions as shown in FIG. 9B. As for dates and time, the tags related to the date information shown in FIG. 8A are used. As for GPS, the tags related to the GPS information shown in FIG. 8B are used.

Figure 10:
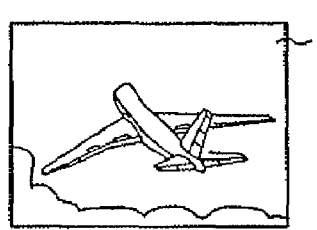
FIG. 10 is an explanatory view for an Exif image transmitted as an unlock image from the access restriction removal-side digital television set to the access control apparatus according to the first embodiment of the present invention.

FIG. 10 is an explanatory view for an Exif image transmitted as the unlock image from the access restriction removal-side digital television set 202 to the access control apparatus 100. In FIG. 10, reference symbol 1000 denotes an example of a displayed image of the unlock image, and 1001 denotes a part of the information stored in the image as the Exif data, i.e., the additional information.

The access control apparatus 100 compares a date, a time, and GPS information of the received unlock image with a date, a time, and GPS information of the lock image stored in the content database held in the storage section 105. If determining that the unlock image and the lock image are similar in time and location, the access control apparatus 100 gives an access permission to the access restriction removal-side digital television set 202 that is the sender of the unlock image.

Figure 11A:
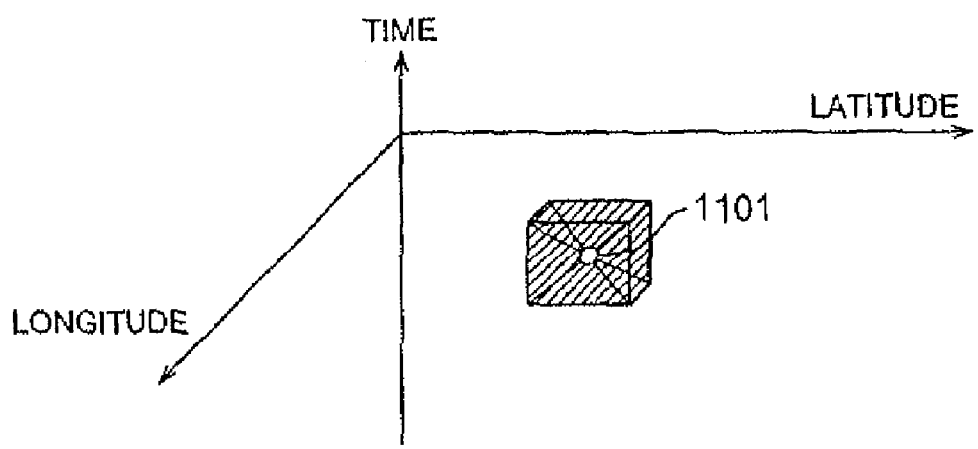
FIGS. 11A and 11b are explanatory view for an access restriction removal determining method according to the first embodiment of the present invention.
Figure 11B:
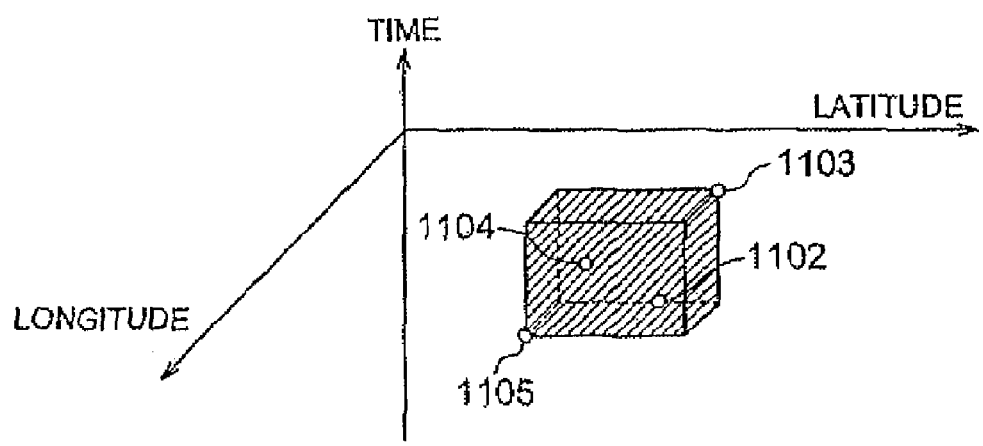

FIGS. 11A and 11b depict the access restriction removal determining method. If the number of lock images stored in the content database is one, a certain error is set in each of a time direction, a latitude direction, and a longitude direction relative to a time, a latitude, and a longitude of the lock image (the lock image having the time, the latitude, and the longitude is denoted by reference symbol 1101), respectively, as shown in FIG. 11A, thereby determining an access permission range. The access permission range corresponds to, for example, a rectangular parallelepiped indicated by oblique lines shown in FIG. 11A. This error may be an arbitrary default owned by the access control apparatus 100 or may be set by the access restriction setting-side digital television set 201 by a user's operation. Further, as shown in FIG. 11B, if the number of lock images stored in the content database is two or more (respective lock images having individual times, latitudes, and longitudes are denoted by reference symbols 1102 to 1105), a range that contains the times, the latitudes, and the longitudes of all the lock images is set as the access permission range. Similarly to FIG. 11A, the access permission range corresponds to, for example, a rectangular parallelepiped indicated by oblique lines as shown in FIG. 11B.

If the time, the latitude, and the longitude included in the Exif data on the unlock image received by the access control apparatus 100 are included in the access permission range, the access control apparatus 100 gives the access permission to the access restriction removal-side digital television set 202 that is the sender of the unlock image.

Using the above-stated method, the access control according to the present invention can be realized.

In the first embodiment, for the sake of description, the "Register" key and the "Return" key are provided as the buttons on the remote controller. As long as equivalent functions for the "Register" key and the "Return" key are allocated to the remote controller, the present invention is not limited to the instance of providing these buttons of the "Register" key and the "Return" key.

In the first embodiment, the access restriction is set to each image group. Alternatively, the access restriction can be set to a certain image.

Furthermore, in this embodiment, the access restriction is set only to the viewing of the original image. Alternatively, a plurality of levels of access restrictions such as a setting of the other unlock image and an error of an access permission range for permission of storing the viewed original image can be set.

Moreover, in this embodiment, the unlock image is transmitted for removing the access restriction. Actually or alternatively, after the user selects the image, only the Exif data necessary for the access restriction removal may be transmitted.

Through the above-stated flow, the program for running a computer in a control circuit of a server (access-control side) and the program for running a computer in a control circuit of a digital television (access-requested side) are performed, respectively.

Preferably, Internet is used as a network between an access control apparatus and an access-requested apparatus. However, other network except Internet can be used.

As described above in the first embodiment, the server as the access control apparatus and digital television as the access-requested apparatus have a chassis, respectively.

Moreover, a user can place the digital television at a predetermined position, provided that the digital television can be connect to the access control apparatus trough a network.

Accordingly, a user can set relative positioning relationship between the access-requested apparatus and the access control apparatus, provided that the access-requested apparatus can be connect to the access control apparatus trough a network.

(Second Embodiment)

A second embodiment of the present invention will be described. The second embodiment of the present invention characteristically differs from the first embodiment in the access control apparatus and the access restriction setting-side digital television set.

Only the differences of the second embodiment from the first embodiment will be described herein. Same constitutions and operations as those according to the first embodiment are denoted by the same reference symbols as those used in the first embodiment, respectively.

Figure 12:
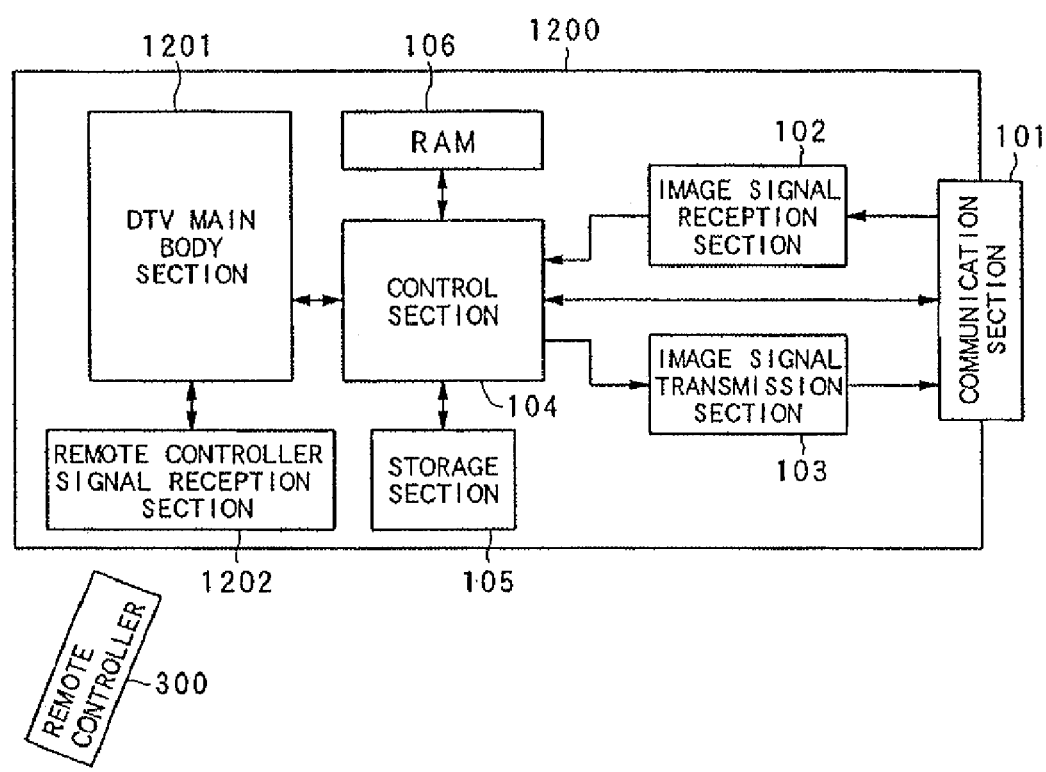
FIG. 12 is a block diagram that depicts a schematic configuration of an access control apparatus according to a second embodiment of the present invention.
Figure 13:
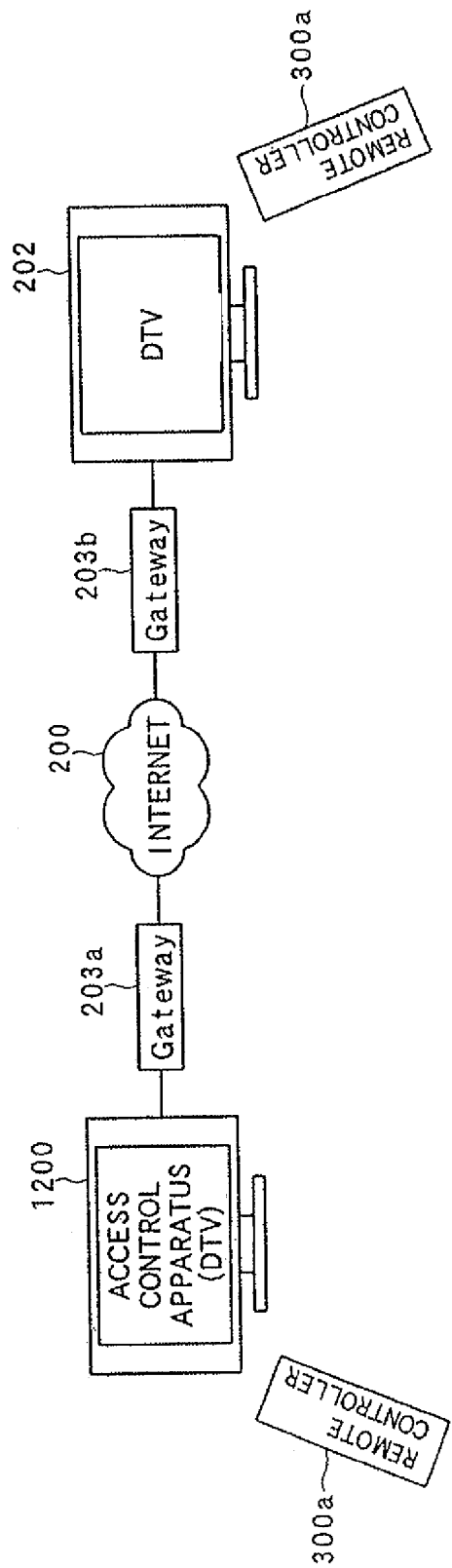
FIG. 13 is a block diagram that depicts a configuration of an access control system including the access control apparatus according to the second embodiment of the present invention.

FIG. 12 is a block diagram that depicts a schematic configuration of an access control apparatus according to the second embodiment of the present invention. FIG. 13 is a block diagram that depicts a configuration of an access control system.

Referring to FIG. 12, reference symbol 1200 denotes the access control apparatus that also functions as a digital television set. Namely, the access control apparatus 1200 is a combination of the access control apparatus 100 and the access restriction setting-side digital television set 201 according to the first embodiment.

The access control apparatus 1200 according to the second embodiment includes a digital television main body section 1201, a remote controller signal reception section 1202, and a remote controller 300 as well as the functions of the access control apparatus 100 according to the first embodiment. The digital television main body section 1201 includes functions that constitute a basic digital television set, e.g., a tuner, a demultiplexer, a decoder, an operation panel, and a display (display section), all of which are not shown.

Referring to FIG. 13, reference symbol 1200 denotes the access control apparatus that includes the digital television function according to the second embodiment. The access control apparatus 1200 communicates with an access restriction removal-side digital television set 202 that is a client machine, through gateways 203a and 203b and the Internet 200.

The access restriction setting screen configuration and the user's operation for the access control apparatus 1200 are equal to those shown in FIGS. 4A and 4B except that the server registration related function is eliminated. Likewise, the access restriction removal screen configuration and the user's operation of the access restriction removal-side digital television set 202 are completely equal to those shown in FIGS. 5A to 5D.

Figure 14:
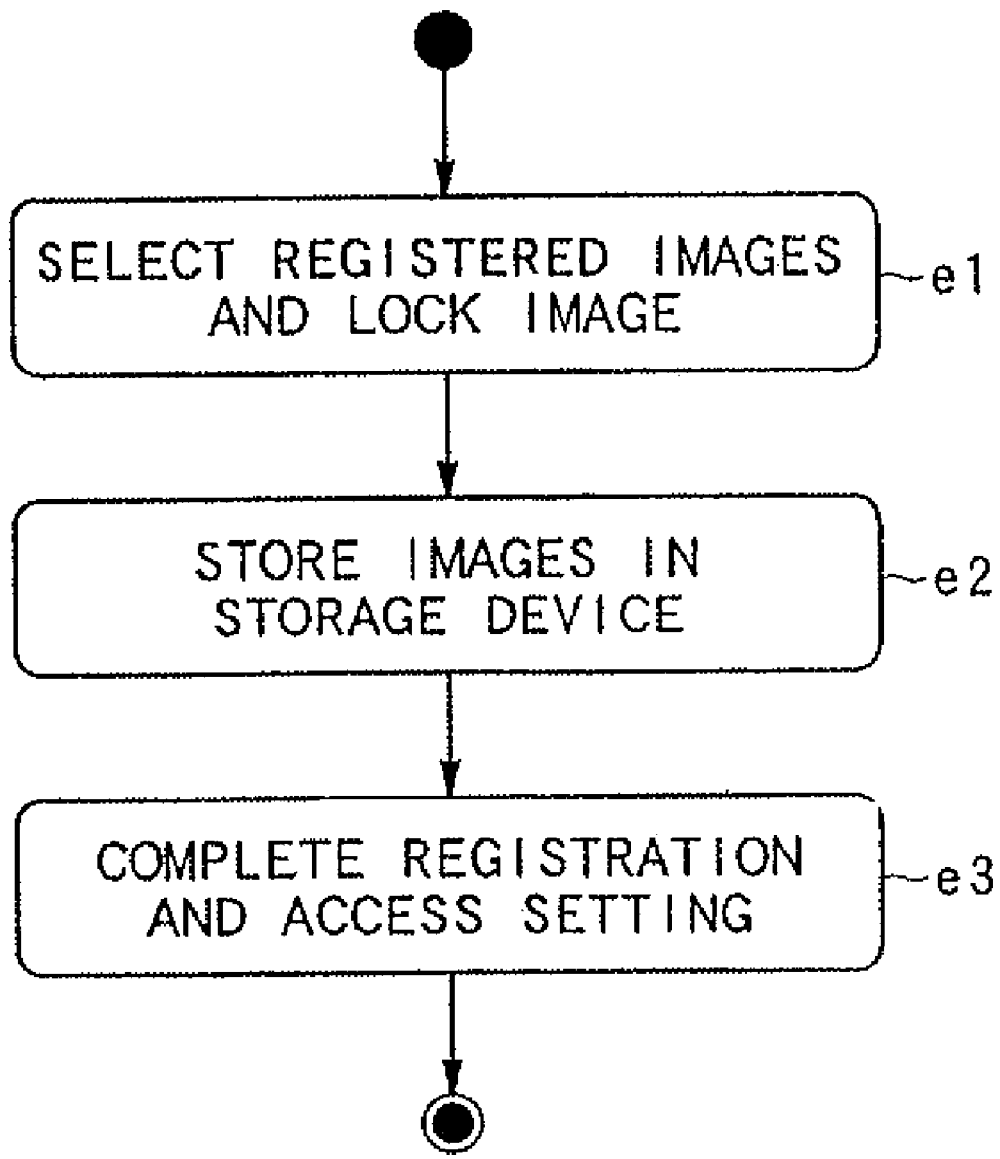
FIG. 14 is a flowchart for describing an open image registration and an access setting performed by the access control apparatus according to the second embodiment of the present invention.

FIG. 14 is a flowchart for an open image registration and an access setting performed by the access control apparatus 1200.

The access control apparatus 1200 selects registered images and a lock image designated by a user's operation (at a step e1). The selected registered images and lock image are stored in a content database held in a storage section 105 to be described later (at a step e2). Thus, the open image registration and the access setting performed by the access control apparatus 1200 are completed (at a step e3).

A flowchart that depicts the interaction between the access restriction removal-side digital television set 202 and the access control apparatus 1200 for the access restriction removal is equal to that shown in FIG. 7.

FIG. 15 depicts an example of the content database held in the storage section 105 according to this embodiment. The difference of the content database according to the second embodiment from that according to the first embodiment is that the content database does not hold information on the registering apparatus for identifying an apparatus. In addition, if the user does not designate an image group identifier, a serial number in ascending order is allocated by default.

An access restriction removal determining method by transmitting the unlock image from the access restriction removal-side digital television set 202 to the access control apparatus 1200 is equal to that according to the first embodiment.

The access control system constituted as stated above can exercise the same control as that exercised according to the first embodiment, thereby realizing the access control according to the present invention.

(Third Embodiment)

A third embodiment of the present invention will be described. The third embodiment characteristically differs from the first and the second embodiments in access restriction removal determining method.

Only the difference of the third embodiment from the first and the second embodiment will be described herein.

The access restriction removal determining method according to the third embodiment differs from that according to the first and the second embodiments in that an apparatus identifier recorded in Exif data is used for the access restriction removal determination.

When an image is photographed, a digital camera stores an apparatus identifier of an information terminal obtained from a subject in a MarkerNote tag (tag No. 0x927C) of Exif data on the image.

This apparatus identifier suffices to be able to uniquely identify each apparatus similarly to, for example, an MAC address. In this embodiment, it is assumed that the apparatus identifier is constituted by former 24 bits corresponding to each manufacture-specific address managed by IEEE and latter 24 bits corresponding to an eigenvalue that is allocated by each manufacture and that is not overlapped with the other eigenvalues, that is, the apparatus identifier is constituted by 48 bits in all.

Further, this apparatus identifier is transmitted from the information terminal, which includes, for example, a wireless IC tag, to the digital camera, which includes, for example, a wireless IC tag reader.

An access control apparatus 100 makes a setting of giving an access restriction to a specific image group using the apparatus identifier, and displays a list of thumbnail images.

A user of an access restriction removal-side digital television set 202 photographs the information terminal which the user held when the user is photographed as a subject using a digital camera equal in configuration to the above-stated digital camera so as to remove the access restriction and to view an original image, and transmits the photographed image to the access control apparatus 100 as an unlock image.

The access control apparatus 100 determines whether an apparatus identifier described in a MarkerNote tag of Exif data on the received unlock image has a predetermined relationship with each of all original images corresponding to the thumbnail images displayed as the list, that is, determines whether the apparatus identifier is present in the MarkerNote tag on the Exif data on each of the original images. If the apparatus identifier is present, the access restriction is removed. It is noted that the apparatus identifier described in the MarkerNote tag corresponds to information that indicates photographic conditions.

By thus constituting the access restriction removal determining method, it is possible to set a stricter access control than those according to the first and the second embodiments. Further, by combining the access restriction removal determining method using the time and location information included in the Exif data according to the first and the second embodiments with the determining method according to this embodiment, it is possible to exercise a plurality of levels of access controls.

(Fourth Embodiment)

A fourth embodiment of the present invention will be described. The fourth embodiment of the present invention is characterized in that an access restriction setting and an access restriction removal differ between stages.

Only the difference of the fourth embodiment from the first to the third embodiments will be described herein.

An access control apparatus according to this embodiment is equal to those according to the first to the third embodiments in that an unlock image is necessary to remove an access restriction when an original image is to be viewed. Further, the access control apparatus according to this embodiment exercises another access control using a password that is already widespread when an original image is to be stored.

Namely, as a first access restriction, the access control apparatus requests an access restriction removal-side digital television set to transmit the unlock image so as to give an access permission to an original image. As a second access restriction, the access control apparatus requests the access restriction removal-side digital television set to input a password so as to give a permission to store the original image that is being viewed.

If a user of the access restriction removal-side digital television set can transmit an appropriate unlock image to the access control apparatus so as to remove the access restriction, the user is permitted to view the original image. In addition, if the user of the access restriction removal-side digital television set recognizes an appropriate password, the user can store the image in the access restriction removal-side digital television set that is a digital television set of the user.

As can be seen, the access control apparatus according to this embodiment exercises not only the access control using the unlock image but also the access control using the password, whereby a plurality of levels or stages of access restrictions can be set and removed.

According to this embodiment, it is determined whether to remove the access restriction based on the unlock image so as to access the original image, and it is determined whether to remove the access restriction based on the password so as to store the original image. Alternatively or conversely, the determination based on the password may be conducted so as to access the original image, and the determination based on the unlock image may be conducted so as to store the original image.

According to this embodiment, both the unlock image and the password are used to exercise the access controls by stages, respectively. Alternatively, transmission of both of the unlock image and the password can be requested in each access control so as to realize a stricter access control.

This application claims priority from Japanese Patent Application No. 2004-015919 filed Jan. 23, 2004, and Japanese Patent Application No. 2005-008723 filed Jan. 17, 2005, which are hereby incorporated by reference herein.

What is claimed is:

1. A content processing apparatus, comprising:
a display control unit configured to display, on a display device, a plurality of contents and a plurality of checkboxes respectively corresponding to the plurality of contents;
a designation unit configured to designate at least one of the checkboxes according to a user's operation; and
a processing unit configured to perform a predetermined process on a content corresponding to a checkbox designated by the designation unit;
wherein the display control unit displays a checkbox which is not designated by the designation unit in a first appearance, wherein the display control unit displays the checkbox in a second appearance if the checkbox which has been displayed in the first appearance is further designated by the designation unit, wherein the display control unit displays the checkbox in a third appearance if the checkbox which has been displayed in the second appearance is further designated by the designation unit, wherein the first appearance, the second appearance and the third appearance are different from each other, and wherein the processing unit performs a first processing on the content corresponding to the checkbox displayed in the second appearance, and performs the first processing and a second processing on the content corresponding to the checkbox displayed in the third appearance.

2. A content processing apparatus according to claim 1, wherein if a checkbox which is displayed in the third appearance is designated by the designation unit, designation by the designation unit is cancelled.

3. A content processing apparatus according to claim 1, wherein the contents include image data.

4. A content processing apparatus according to claim 1, wherein the processing unit registers the content corresponding to the checkbox displayed in the second appearance to an external apparatus.

5. A content processing apparatus according to claim 1, wherein the processing unit selects the content corresponding to the checkbox displayed in the third appearance as a content for access restriction.

6. A content processing apparatus according to claim 1, wherein the processing unit registers the content corresponding to the checkbox displayed in the second appearance to an external apparatus, and registers the content corresponding to the checkbox displayed in the third appearance to the external apparatus and selects the content corresponding to the checkbox displayed in the third appearance as a content for access restriction.

7. A content processing apparatus according to claim 1, wherein the display control unit displays guidance about checkboxes displayed in the second and the third appearance with the plurality of checkboxes.

8. A content processing apparatus according to claim 1, further comprising an indication unit configured to receive an instruction to instruct execution of the processing by the processing unit, wherein the processing unit performs the processing after the indication unit receives the instruction.

9. A content processing apparatus for registering image data to an access controlling apparatus which controls access to registered image data, comprising:

a display control unit configured to display, on a display device, a plurality of image data and a plurality of checkboxes respectively corresponding to the plurality of image data;

a designation unit configured to designate at least one of the checkboxes according to a user's operation;

a processing unit configured to perform a predetermined process on image data; and an indication unit configured to receive an instruction to instruct execution of the predetermined process by the processing unit from the user, wherein the display control unit displays a checkbox which is not designated by the designation unit in a first appearance, wherein the display control unit displays the checkbox in a second appearance if the checkbox which has been displayed in the first appearance is further designated by the designation unit, wherein the display control unit displays the checkbox in a third appearance if the checkbox which has been displayed in the second appearance is further designated by the designation unit, and wherein after the indication unit receives the instruction, the processing unit registers image data corresponding to checkboxes displayed in the second appearance and the third appearance to the access control apparatus, and selects image data corresponding to a checkbox displayed in the third appearance as data for access restriction to the registered image data.

* * * * *